(12) United States Patent
Storage et al.

(10) Patent No.: US 6,439,619 B1
(45) Date of Patent: Aug. 27, 2002

(54) PIPE FLANGE CLOCKING

(75) Inventors: Michael Ralph Storage, Beavercreek; Leon James Bryan, Jamestown; David Lee Graham, Xenia, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/690,054

(22) Filed: Oct. 16, 2000

(51) Int. Cl.[7] .............................................. F16L 25/06
(52) U.S. Cl. ....................... 285/330; 285/365; 285/408
(58) Field of Search ............................... 285/330, 913, 285/914, 363–5, 368, 405–8

(56) References Cited

U.S. PATENT DOCUMENTS

| | | | | |
|---|---|---|---|---|
| 3,480,302 A | * | 11/1969 | Jeffery et al. | 285/400 |
| 3,744,825 A | * | 7/1973 | Cooper et al. | 285/407 |
| 4,126,338 A | * | 11/1978 | Coel et al. | 285/330 |
| 4,448,449 A | * | 5/1984 | Halling et al. | 285/263 |
| 4,600,222 A | * | 7/1986 | Appling | 285/158 |
| 4,613,163 A | * | 9/1986 | Grosshandler | 285/27 |
| 4,919,453 A | | 4/1990 | Halling et al. | |
| 5,494,138 A | | 2/1996 | Scelsi et al. | |

FOREIGN PATENT DOCUMENTS

CH     647307 A5   *   1/1985  ................. 285/364

OTHER PUBLICATIONS

"Leader in the design and manufacture of metallic tube and duct systems for aerospace and power generation" ELANO Corporation, a subsidiary of GE Aircraft Engines, brochure.

"Rigid and Flexible Pneumatic Ducting Components & Systems", EG&G Pressure Science, Inc., Engineer's Data Book, pp. 1–8 and 31–40.

* cited by examiner

*Primary Examiner*—Lynne H. Browne
*Assistant Examiner*—Michael P. Ferguson
(74) *Attorney, Agent, or Firm*—Nathan D. Herkamp; Steven J. Rosen

(57) ABSTRACT

A pipe connection includes a longitudinally extending first pipe portion having an annular first flange at a first distal end of the first pipe and a longitudinally extending second pipe portion having an annular second flange at a second distal end of the second pipe. One of the flanges is a male flange and the other of the flanges is a female flange. The male flange has a ring shaped male wall longitudinally extending from a longitudinally facing flat surface of the male flange. The female flange has a ring shaped female wall longitudinally extending from a longitudinally facing first flat surface of the female flange. The male and female walls are shaped and sized such that the male wall is received within the female wall. A detent is formed from, in, and extending radially away from a first one of the walls toward a second one of the walls. A notch extends radially into the second one of the walls and is sized and shaped to receive the detent therein. In the exemplary embodiment of the invention, the notch is machined part-way into the second one of the walls. The detent may be a dent punched into the first one of the walls. The notch may be cylindrical in shape. In the exemplary embodiment of the invention, the notch is formed in the male wall and the detent is formed in the female wall. One embodiment of the invention includes a clamp having retaining members with grooves circumscribing at least part of the flanges with the male wall received within the female wall. The grooves and the flanges are tapered.

14 Claims, 2 Drawing Sheets

PIPE FLANGE CLOCKING

BACKGROUND OF THE INVENTION

The present invention relates to connecting two pipes or tubes at their flanges and more particularly to connecting the flanges with the two pipes or tubes clocked or circumferentially angled with respect to each other.

Pipes or tubes are often clamped together at their flanges with couplings that have been used for making fluid joints such as for conducting high temperature and pressure fluids. The flanges are typically male and female with the male flange received within the female flange. The male flange has an inner ring wall received within an outer ring wall of the female flange. An example of such a coupling is found in U.S. Pat. No. 4,919,453 entitled "Low Profile V-Coupling" assigned to EG&G Pressure Science, Inc. (Beltsville, Md). In the gas turbine engine industry and in particular in the aircraft gas turbine engine industry many of the connections are made between bent pipes that may have compound bends in the axial, circumferential, and radial directions. Because space is limited and many tubes and pipes are located on outside casings of the engine the relative angular orientation or clocking, as it is referred to in the industry, between the two coupled pipes is very important. To that end clocking tabs or other protrusions have been welded onto one of the flanges and mating slots or holes have been cut through the other flange. The designed clocking of the two pipes is achieved when the tab or protrusion is set in the slot or hole. These clocking features require manufacturing of the tabs and slots and subsequent welding of the tab to its respective flange. This adds expense and time to the manufacturing process and increases cost of the fluid joint and thus it is desirable to be able to clock the male and female flanges relative to each other with clocking features that are is less expensive and less time consuming to manufacture as compared to present designs.

BRIEF SUMMARY OF THE INVENTION

A pipe connection includes a longitudinally extending first pipe portion having an annular first flange at a first distal end of the first pipe and a longitudinally extending second pipe portion having an annular second flange at a second distal end of the second pipe. One of the flanges is a male flange and the other of the flanges is a female flange. The male flange has a ring shaped male wall longitudinally extending from a longitudinally facing flat surface of the male flange. The female flange has a ring shaped female wall longitudinally extending from a longitudinally facing first flat surface of the female flange. The male and female walls are shaped and sized such that the male wall can be received within the female wall. A detent is formed from and in and extending radially from a first one of the walls toward a second one of the walls. A notch extends radially into the second one of the walls and is sized and shaped to receive the detent therein. In the exemplary embodiment of the invention, the notch is machined part-way into the second one of the walls. The detent may be a dent punched into the first one of the walls. The notch may be cylindrical in shape.

In the exemplary embodiment of the invention, the notch is formed in the male wall and the detent is formed in the female wall. One embodiment of the invention includes a clamp having retaining members with grooves circumscribing at least part of the flanges with the male wall received within the female wall. The grooves and the flanges are tapered.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
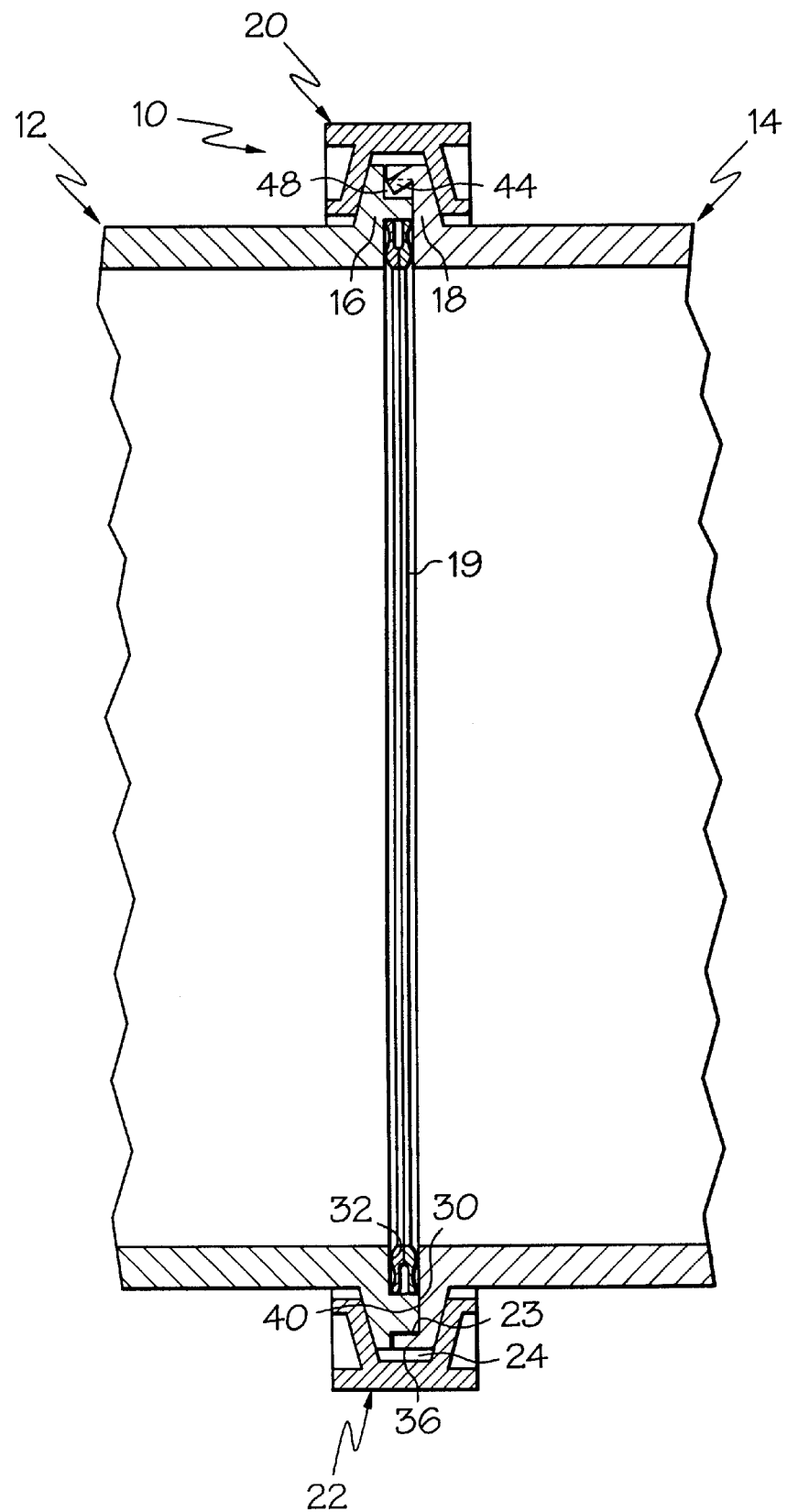
FIG. 1 is a longitudinal sectional view illustration of an exemplary embodiment of a coupled pair of male and female peripheral flanges with clocking features of the present invention coupling and clocking of a pair of coupled pipes.

Referring now to the drawing in detail, wherein identical numerals indicate the same elements throughout the figures, FIG. 1 depicts an exemplary embodiment of a clocking pipe connection 10 of the present invention connecting and clocking (angularly aligning) first and second male and female peripheral tapered flanges 16 and 18 of first and second coaxial pipe portions 12 and 14 respectively. For the purpose of this patent the term pipes includes tubes. The male and female flanges 16 and 18 respectively (as further illustrated in FIGS. 2 and 3) are coaxial and in abutment with each other and having an E-shaped seal 19 positioned therebetween. A coupling clamp denoted by retaining members 20 and 22 has inner circumferentially extending V-shaped grooves 24 receiving the male and female flanges 16 and 18 therein. The clamp is a well known type more particularly described in U.S. Pat. No. 4,919,453 which is incorporated herein by reference.

Figure 2:
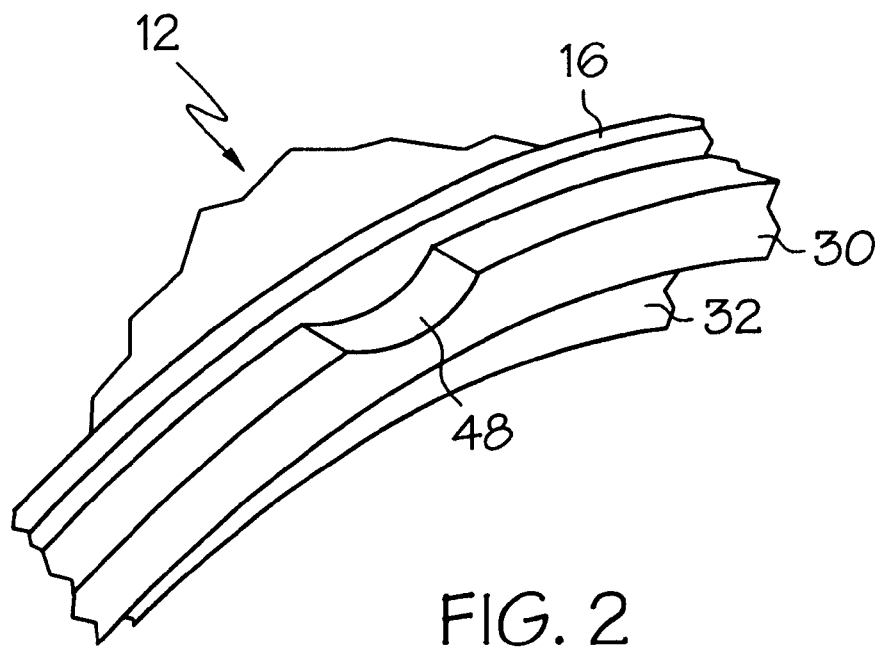
FIG. 2 is a perspective view illustration of a clocking feature on the male peripheral flange.
Figure 3:
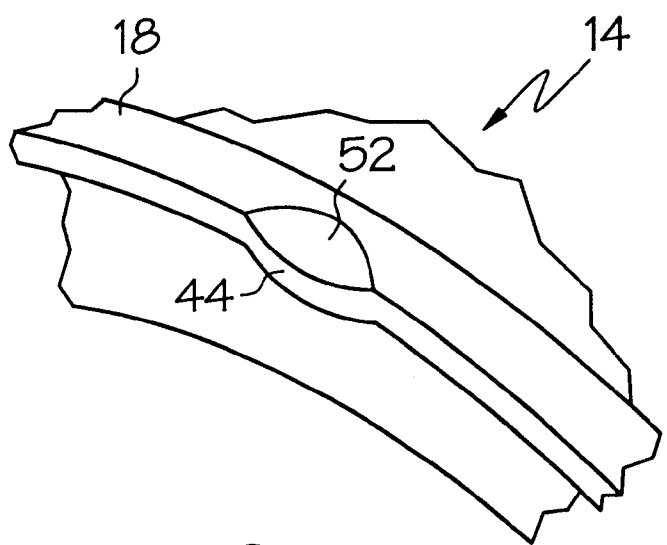
FIG. 3 is a perspective view illustration of a clocking feature on the female peripheral flange.

Referring further to FIGS. 2 and 3, the male flange 16 has a ring shaped male wall 30 longitudinally extending from a longitudinally facing flat surface 32 of the male flange. The female flange 18 has a ring shaped female wall 36 longitudinally extending from a longitudinally facing first flat surface 40 of the female flange. The male and female walls 30 and 36 are shaped and sized such that the male wall is received within the female wall when the pipes are connected with the invention. A detent 44 is formed from and in and extending radially from a first one of the walls toward a second one of the walls and a notch 48 extends radially into the second one of the walls and is sized and shaped to receive the detent therein.

In exemplary embodiment the detent 44 is formed in the female wall 18 and the notch 48 is formed in the male wall 30. In the exemplary embodiment of the invention, the notch 48 is machined part-way into the male wall. The detent 44 is illustrated as a dent 52 punched into the female wall 36. The notch 48 may be machined into the male wall 30 with a grinder or milling machine and may be cylindrical in shape.

The exemplary embodiment of the clocking pipe connection 10 of the present invention includes a clamp 20 having retaining members with grooves circumscribing at least part of the flanges with the male wall received within the female wall. The grooves and the flanges are tapered.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed is:

1. A pipe connection comprising:

a longitudinally extending first pipe portion having an annular first flange at a first distal end of said first pipe, a longitudinally extending second pipe portion having an annular second flange at a second distal end of said second pipe, one of said flanges being a male flange and other of said flanges being a female flange, said male flange having a ring shaped male wall longitudinally extending from a longitudinally facing flat surface of said male flange and said female flange having a ring shaped female wall longitudinally extending from a longitudinally facing first flat surface of said female flange, said male and female walls shaped and sized such that said male wall can be received within said female wall, a detent formed from and in and extending radially from a first one of said walls toward a second one of said walls, and a notch extending radially into said second one of said walls sized and shaped to receive said detent wherein said detent and said notch clock said male and female flanges with respect to each other.

2. A pipe connection as claimed in claim 1 wherein said notch is machined part-way into said second one of said walls.

3. A pipe connection as claimed in claim 2 wherein said notch is cylindrical in shape.

4. A pipe connection as claimed in claim 1 wherein said detent is a dent punched into said first one of said walls.

5. A pipe connection as claimed in claim 4 wherein said notch is machined part-way into said second one of said walls.

6. A pipe connection as claimed in claim 5 wherein said notch is cylindrical in shape.

7. A pipe connection as claimed in claim 1 wherein said notch is formed in said male wall and said detent is formed in said female wall.

8. A pipe connection comprising:

a longitudinally extending first pipe portion having an annular male flange at a first distal end of said first pipe, a longitudinally extending second pipe portion having an annular female flange at a second distal end of said second pipe, said male flange having a ring shaped male wall longitudinally extending from a longitudinally facing flat surface of said male flange, and said female flange having a ring shaped female wall longitudinally extending from a longitudinally facing first flat surface of said female flange, said male wall received within said female wall, a detent formed from and in and extending radially from a first one of said walls toward a second one of said walls, and a notch extending radially into said second one of said walls sized and shaped to receive said detent wherein said detent and said notch clock said male and female flanges with respect to each other.

9. A pipe connection as claimed in claim 8 wherein said notch is machined part-way into said male wall.

10. A pipe connection as claimed in claim 8 wherein said detent is a dent punched into said female wall.

11. A pipe connection as claimed in claim 10 wherein said notch is machined part-way into said male wall.

12. A pipe connection as claimed in claim 11 wherein said notch is cylindrical in shape.

13. A pipe connection as claimed in claim 10 further comprising a clamp having retaining members with grooves circumscribing at least part of said flanges.

14. A pipe connection as claimed in claim 13 wherein said grooves and said flanges are tapered.

* * * * *